J. P. Grosvenor,
Cutter Head.

Nº 16,144. Patented Dec. 2, 1856.

UNITED STATES PATENT OFFICE.

JONATHN. P. GROSVENOR, OF LOWELL, MASSACHUSETTS.

METHOD OF CLAMPING CUTTERS IN CUTTER-HEADS FOR PLANING-MACHINES.

Specification of Letters Patent No. 16,144, dated December 2, 1856.

*To all whom it may concern:*

Be it known that I, JONATHAN P. GROSVENOR, of Lowell, in the county of Middlesex and State of Massachusetts, have invented a new and Improved Mode of Constructing Cutter-Heads for Planing and Molding Machines, of which the following is a full, clear, and exact description, reference being had to the annexed drawings, making part of this specification, in which—

Figure 1:
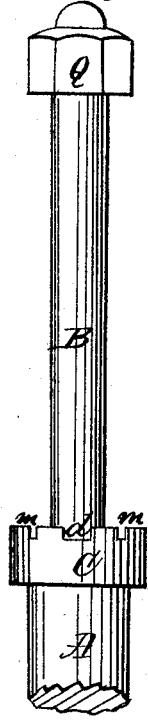
Figure 2:
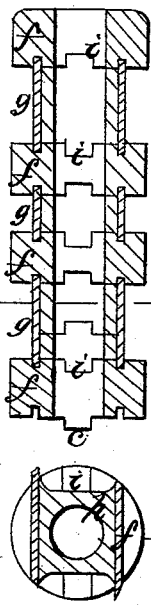
Figure 3:
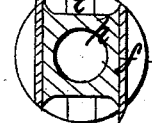
Figure 4:
Figure 5:
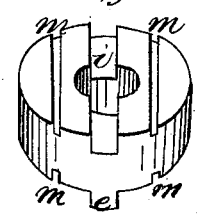

Figure 1, is an elevation of the spindle and a portion of its shaft; Fig. 2, a vertical section through the collars, core blocks and cutters, as arranged upon the spindle; Fig. 3 a horizontal section upon the line *x*, *x*, of Fig. 2; Fig. 4, a perspective view of one of the core blocks; Fig. 5 a perspective view of one of the collars.

My improvements are particularly applicable to the machine for cutting moldings for which Letters Patent were granted to Nathaniel Gear on the 8th of November 1853, though it is not limited in its application to this machine alone.

In cutting moldings upon regular and irregular forms, it often happens a small molding is required upon the top of a thick piece of stuff. Heretofore for this purpose, long irons have been employed reaching from the top to the bottom of the cutter head, and having a suitably formed cutter at the proper point of the iron. Such cutter answers only for one particular thickness of stuff, and for a single point of application to the stuff; they are moreover expensive and of very limited application.

To enable me to employ a smaller cutter of the shape of the molding required, and to make use of such cutter in any position upon the edge of the molding is the object of my present invention. It is evident that it would not answer to employ ordinary collars for the purpose of raising the cutters to the height required as these collars would not hold the cutters with sufficient rigidity, but would allow them to twist, and endanger their breaking—to remedy this evil I employ collars both above and below the cutters, in connection with intervening core blocks, the collars and core blocks being so connected together by means of tongues and grooves as to form an unyielding support to the cutters and prevent the twisting of the head or the breaking of the cutters, while any part of the head not occupied by cutters may be used as a guide or gage to the pattern of the thing to be cut or molded.

To enable others skilled in the art to understand my invention I will proceed to describe the manner in which I have carried it out.

In the said drawings, A, is the cutter shaft; B, the spindle which projects above the surface of the table, and to which the cutters are secured; this spindle may make a part of the shaft A, or may be secured thereto by a screw or otherwise.

C, is a collar secured to the shaft and having a groove *d* in its upper surface.

*f*, *f*, are collars similar to the collar C, having a hole through the center for the passage of the spindle and either tongues *e*, or grooves *i* in their upper and lower surfaces. They are also provided with grooves *m*, in both surfaces for the reception of the cutters *g* and to prevent the liability of these collars to twist, core blocks *h* Fig. 4 are inserted between them which answer the double purpose of supporting and sustaining the cutters and of rigidly connecting the collars and cutters to the shaft. Collars and core blocks are to be provided of various thicknesses to accommodate the different sizes of cutters employed, and also for the purpose of raising the cutters to the exact height required above the table of the machine.

In arranging the cutters for use, a suitable number of collars are placed upon the spindle to raise the cutter to the required height above the table. One or more core blocks are then placed upon the spindle, and upon these another collar, the height of the core blocks being sufficiently less than the height of the cutters to enable the latter to be held firmly in place by the collars. The cutters and collars are secured to the spindle by the nut Q, in the customary manner. Where a single set of cutters are employed, the core blocks may be dispensed with, but it becomes necessary if the cutters are raised to such a height above the level of the surface of the table as to require the interposition of additional collars between them and the collar C, that these collars be connected with each other and with the collar C, by means of tongues and grooves as before explained. When however more than one set of cutters are employed one above the other, it is necessary to interpose the core blocks between the lower sets of collars to relieve these cutters from the strain that would otherwise be thrown upon them.

Heretofore I have spoken of the core blocks and collars as separate and distinct from each other; they may however be permanently united together or formed of one piece of metal, and this method under some circumstances may be preferred. When a molding is to cover the entire edge of the material, two sets of cutters may be employed, the extreme projecting edge of the article resting upon the intermediate collar *f*, and thus the pattern heretofore necessary may be dispensed with. In lieu of the tongues and grooves above described, pins and holes may be employed to connect the collars and core blocks, but these I consider to be the equivalent of the tongues and grooves.

What I claim as my invention and desire to secure by Letters Patent, is—

Connecting the collars with each other or with the core blocks by means of tongues and grooves in the manner substantially as described for the purpose set forth.

JONA. P. GROSVENOR.

Witnesses:
SAML. S. HEPWORTH,
J. L. MORTON.